(12) United States Patent
Gao

(10) Patent No.: US 6,581,094 B1
(45) Date of Patent: Jun. 17, 2003

(54) APPARATUS AND METHOD FOR IDENTIFYING A DIGITAL DEVICE BASED ON THE DEVICE'S UNIFORM DEVICE DESCRIPTOR FILE THAT SPECIFIES THE ATTRIBUTES OF THE DEVICE IN A XML DOCUMENT IN A NETWORKED ENVIRONMENT

(75) Inventor: Jici Gao, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/433,003

(22) Filed: Nov. 2, 1999

(51) Int. Cl.⁷ .............................................. G06F 15/16
(52) U.S. Cl. ........................ 709/220; 709/223; 709/327
(58) Field of Search ................................ 709/106, 202, 709/219, 221, 227, 327, 220, 223

(56) References Cited

U.S. PATENT DOCUMENTS

| 5,333,315 A | * | 7/1994 | Saether et al. | |
| 5,802,365 A | * | 9/1998 | Kathail et al. | |
| 5,913,037 A | * | 6/1999 | Spofford et al. | |
| 5,920,725 A | * | 7/1999 | Ma et al. | |
| 5,920,868 A | * | 7/1999 | Fowlow et al. | |
| 5,949,998 A | * | 9/1999 | Fowlow et al. | |
| 5,956,506 A | * | 9/1999 | Cobb et al. | |
| 5,968,116 A | * | 10/1999 | Day, II et al. | 709/202 |
| 5,969,967 A | * | 10/1999 | Aahlad et al. | |
| 5,991,823 A | * | 11/1999 | Cavanaugh, III et al. | |
| 5,996,012 A | * | 11/1999 | Jarroel | |
| 5,999,940 A | * | 12/1999 | Ranger | |
| 6,006,251 A | * | 12/1999 | Toyouchi et al. | 709/219 |
| 6,009,467 A | * | 12/1999 | Ratcliff et al. | |
| 6,029,175 A | * | 2/2000 | Chow et al. | |
| 6,108,712 A | * | 8/2000 | Hayes, Jr. | |
| 6,163,806 A | * | 12/2000 | Viswanathan et al. | |
| 6,167,441 A | * | 12/2000 | Himmel | 709/219 |

(List continued on next page.)

FOREIGN PATENT DOCUMENTS

| WO | WO 98/08153 | 2/1998 |
| WO | WO 99/35856 | 7/1999 |
| WO | PCT/US00/30046 | 11/2000 |

OTHER PUBLICATIONS

Czerwinski et al., "An Architecture for A Secure Service Discovery Service", Computer Science Division UC, Berkeley, 1999, pp. 24–35.

Hodes et al., "Composable ad hoc location–based services for heterogeneous mobile clients", Wireless Networks 5 1999, pp. 411–427.

Tim Bray, Jean Paoli and C.M. Sperberg–McQueen. "Extensible Markup Language (XML) 1.0", W3C Recommendation, Feb. 10, 1998, pp. 1 of 33.

Norman Walsh, "XML.cm (XML From The Inside Out)", Oct. 3, 1998, pp. 1–9.

*Primary Examiner*—Le Hien Luu
*Assistant Examiner*—Stephan Willett
(74) *Attorney, Agent, or Firm*—Pennie & Edmonds LLP

(57) ABSTRACT

A method executed by one or more digital devices operating in a networked environment includes the step of storing a network address for each digital device of a set of digital devices within a networked environment. A Uniform Device Descriptor file is associated with each digital device of the set of digital devices. Each Uniform Device Descriptor file characterizes a set of attributes associated with its corresponding digital device. Specified attributes in a search request are matched with attributes in a Uniform Device Descriptor file to render a selected digital device.

28 Claims, 3 Drawing Sheets

U.S. PATENT DOCUMENTS

| | | | |
|---|---|---|---|
| 6,198,479 B1 * | 3/2001 | Humpleman et al. ........ 709/202 |
| 6,216,212 B1 * | 4/2001 | Challenger et al. |
| 6,226,788 B1 * | 5/2001 | Schoening et al. |
| 6,263,378 B1 * | 7/2001 | Rudoff et al. ................ 709/327 |
| 6,327,628 B1 * | 12/2001 | Anuff et al. |
| 6,343,287 B1 * | 1/2002 | Kumar et al. |
| 6,345,279 B1 * | 2/2002 | Li et al. |
| 6,353,839 B1 * | 3/2002 | King et al. |
| 6,360,235 B1 * | 3/2002 | Tilt et al. |
| 6,393,557 B1 * | 5/2002 | Guthridge et al. |
| 6,397,259 B1 * | 5/2002 | Lincke et al. |
| 6,401,081 B1 * | 6/2002 | Montgomery et al. |
| 6,418,486 B1 * | 7/2002 | Lortz et al. |
| 6,446,113 B1 * | 9/2002 | Ozzie et al. |
| 6,453,329 B1 * | 9/2002 | Dodgen |
| 6,457,030 B1 * | 9/2002 | Adams et al. |
| 6,463,064 B1 * | 10/2002 | Broockman et al. |
| 6,463,440 B1 * | 10/2002 | Hind et al. |
| 6,466,971 B1 * | 10/2002 | Humpleman et al. |
| 6,473,781 B1 * | 10/2002 | Skagerwall et al. |
| 6,473,807 B1 * | 10/2002 | Hills et al. |
| 6,476,833 B1 * | 11/2002 | Moshfeghi |
| 6,487,607 B1 * | 11/2002 | Wollrath et al. |

* cited by examiner

APPARATUS AND METHOD FOR IDENTIFYING A DIGITAL DEVICE BASED ON THE DEVICE'S UNIFORM DEVICE DESCRIPTOR FILE THAT SPECIFIES THE ATTRIBUTES OF THE DEVICE IN A XML DOCUMENT IN A NETWORKED ENVIRONMENT

BRIEF DESCRIPTION OF THE INVENTION

This invention relates generally to the operation of digital devices in a networked environment. More particularly, this invention relates to an Extensible Markup Language (XML) based technique to identify and operate a networked digital device.

BACKGROUND OF THE INVENTION

Digital devices continue to proliferate. A digital device is an object with a digital circuit that processes digital data. Examples of digital devices include computers, printers, scanners, pagers, digital cameras, fax machines, digital copiers, personal digital assistants, digital appliances, digital telephones, digital projectors, and digital video recorders. The foregoing list is exemplary, the invention is applicable to additional devices, many of which will be developed in the future.

When a digital device is connected to another digital device, it is necessary to specify a common operating system and connectivity scheme. If a common operating system and connectivity scheme are not used, various device drivers must be used to emulate a common scheme. This results in substantial administrative and maintenance expenses for digital devices. Many digital devices do not have the memory or computing power to execute a set of diverse device drivers. As a result, it is not practical to form networked connections between digital devices, unless all of the digital devices share a common operating system and connectivity scheme. This limitation curtails the utilization of digital devices.

It would be highly desirable to provide a mechanism to more fully exploit the use of digital devices. In particular, it would be highly desirable to provide a technique for linking a digital device to a network regardless of the connectivity scheme and operating system used within the network. Ideally, such a scheme would allow easy identification of a digital device within a networked environment. It would also be desirable to utilize the scheme to support the administration and maintenance of digital devices in a networked environment.

SUMMARY OF THE INVENTION

The method of the invention is implemented with one or more digital devices operating in a networked environment. The method includes the step of storing a network address (e.g., an Internet Protocol (IP) address or a Uniform Resource Locator (URL) link) for each digital device of a set of digital devices within a networked environment. A Uniform Device Descriptor file is associated with each digital device of the set of digital devices. Each Uniform Device Descriptor file characterizes a set of attributes associated with its corresponding digital device. Specified attributes in a search request are precisely matched with attributes in a Uniform Device Descriptor file to render a selected digital device.

The apparatus of the invention is a computer readable memory to direct one or more digital devices in a networked environment to function in a specified manner. A digital device list specifies a network address for each digital device of a set of digital devices within a networked environment. A set of Uniform Device Descriptor files includes individual Uniform Device Descriptor files, each of which characterizes a set of attributes associated with a corresponding digital device of the set of digital devices. A search module matches specified attributes in a search request with attributes in a Uniform Device Descriptor file to render a selected digital device.

The invention provides a technique for linking a digital device to a network regardless of the connectivity scheme and operating system used within the network. The invention utilizes a web browser to identify digital devices within a networked environment. The web browser can also be used to operate digital devices within the networked environment. The scheme of the invention also supports the administration and maintenance of digital devices in the networked environment. As discussed below, embodiments of the invention operate without a web browser, yet still exploit the benefits of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
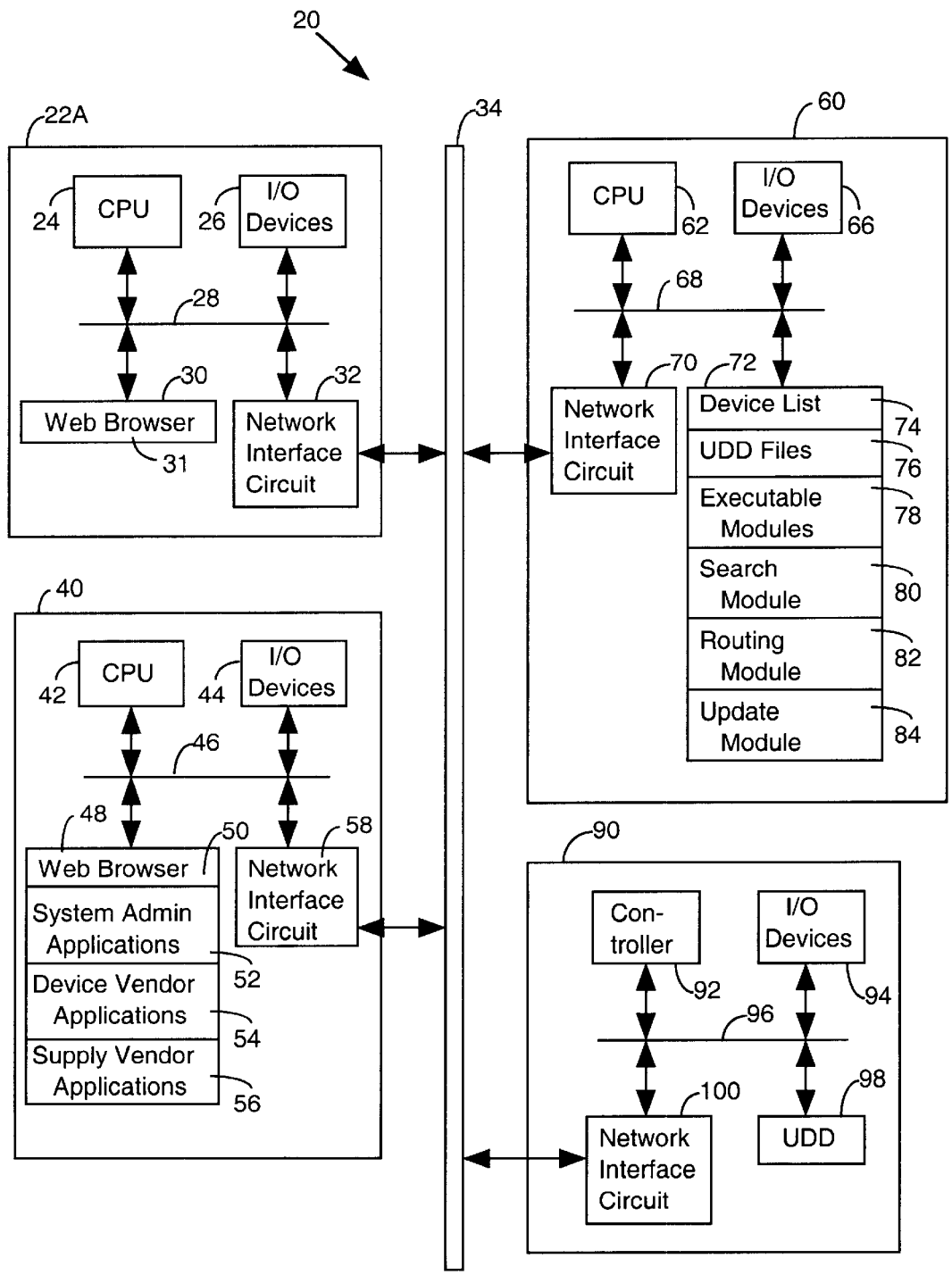
FIG. 1 illustrates a networked environment in which the present invention is implemented.

FIG. 1 illustrates a networked environment 20 that may be used to implement the present invention. The networked environment 20 includes a client computer 22. The client computer 22 is a standard computer including a central processing unit 24 and a set of input/output devices (e.g., keyboard, mouse, monitor, display, printer, and the like) 26 connected by a system bus 28. A memory 30 is also connected to the system bus 28. The memory 30 stores a web browser 31. A network interface circuit 32 is also connected to the system bus 28. The network interface circuit 32 is connected to a transmission channel 34, which may be any wire, wireless, or optical channel.

FIG. 1 further illustrates a supervisory computer 40. The supervisory computer 40 is a client computer dedicated to performing supervisory tasks in connection with digital devices in the networked environment 20. The supervisory computer 40 includes standard components: a central processing unit 42, input/output devices 44, a system bus 46, a memory 48, a web browser 50 and a network interface circuit 58. The supervisory computer 40 departs from standard computers in that it stores a set of novel executable programs that support the technique of the invention. In particular, memory 48 stores system administration applications 52. The system administration applications 52 allow a system administrator to supervise the performance of various digital devices within the networked environment 20. The memory 48 also stores device vendor applications 54. The device vendor applications 54 allow a vendor of digital devices to supply updates and enhancements to digital devices within the networked environment 20. The supply vendor applications 56 allow a vendor of supplies for a digital device to assess whether supplies are required by the digital device. For example, the supply vendor application may query a system printer as to whether it has sufficient paper. The system administrator applications 52, device vendor applications 54, and supply vendor applications 56 are more fully appreciated with reference to the following discussion of the remaining elements of the invention.

FIG. 1 also illustrates a server computer 60. The server 60 includes standard server components: a central processing unit 62, input/output devices 66, a system bus 68, a network interface circuit 70, and a memory 72. The memory 72 stores data and executable programs configured in accordance with the invention. In particular, the memory 72 stores a device list 74. The device list 74 is a list of digital devices within the networked environment that have an associated Uniform Device Descriptor file. Each digital device in the list 74 has an associated network address. For example, the network address may be a Uniform Resource Locator (URL), an addressing technique used on the Internet. As described in detail below, a Uniform Device Descriptor file specifies a set of attributes associated with a digital device. Further, the file may include executable modules or links to executable modules that cause the digital device associated with the file to perform a predetermined operation.

The memory 72 also stores Universal Device Descriptor (UDD) files 76. The UDD files 76 may include a UDD file for the server 60 and UDD files for other digital devices within the networked environment 20.

The server 60 also stores executable modules 78. Each executable module within the set of executable modules 78 performs an action in connection with a specified digital device within the networked environment 20. In other words, a particular digital device may have a function associated with it; that function is implemented by an executable module. Examples of executable modules 78 are discussed below.

The server 60 preferably includes a search module 80. The search module 80 facilitates searches for specified digital devices within the networked environment 20. As discussed below, each digital device with a UDD file may be searched using standard Internet searching techniques. The search module 80 executes searches of this type.

The routing module 82 operates to deliver a specified UDD file to a selected digital device within the networked environment 20 so that the UDD file may be visually displayed on the selected digital device. For example, the routing module 82 may deliver a UDD file to client computer 22 so that it may be displayed on an output device 26 of the client computer 22.

FIG. 1 also illustrates an update module 84. The update module 84 operates to alter a selected Uniform Device Descriptor file in response to an update message. For example, the update message may be sent from the device vendor application 54. The update message may be a standard email, the content of which is incorporated into the UDD file by the update module 84.

FIG. 1 further illustrates a digital appliance 90. The digital appliance 90 refers to any digital device that is not characterized as a client computer or server computer. Thus, the digital appliance 90 may be a printer, a pager, a fax machine, a personal digital assistant, a digital copier, and the like. The digital appliance 90 typically includes a controller 92, input or output devices 94, a system bus 96, and a network interface circuit 100. The digital appliance 90 may also include a UDD file 98. Alternately, the UDD file for the digital appliance may be stored on the server computer 60.

The networked environment of FIG. 1 will typically include a larger number of client computers 22, supervisory computers 40, server computers 60, and digital appliances 90. The Internet is an exemplary networked environment in which the invention is implemented.

Much of the information passed over the Internet today is in the form of Hypertext Markup Language (HTML) documents. Extensible Markup Language (XML) documents are currently being introduced on internet. In a preferred embodiment of the invention, the UDD files are implemented as XML documents.

Extensible Markup Language (XML) establishes a system for defining new languages and formats. XML separates structure and content from presentation. Thus, a single XML source document can be written once, then displayed in a variety of digital devices, such as a computer monitor, a cellular-phone display, and so forth. XML will work on any communication device that might be developed. Thus, an XML document can outlive the particular authoring and display technologies available when it was written. Information about XLM is available at http://www.w3.org and http://www.xml.com.

A Document Type Definition (DTD) is a set of syntax rules for tags. It specifies what tags can be used in a document, what order they should appear in, which tags can appear inside other tags, which tags have attributes, and so on. A DTD can be part of an XML document, but it is usually a separate document or series of documents. Because XML is not a language itself, but rather a system for defining languages, it doesn't have a universal DTD the way HTML does. Instead, each industry or organization that wants to use XML for data exchange can define its own DTDs. If an organization uses XML to tag documents for internal use only, it can create its own private DTD.

A tool for reading XML documents is popularly called an XML parser, though the more formal name is an XML processor. XML processors pass data to an application for authoring, publishing, searching, or displaying. XML doesn't provide an application programming interface (API) to an application, it just passes data to it.

The present invention uses XML syntax to support new functionality. The XML syntax of the invention forms the previously described Unified Device Descriptor UDD. The invention is disclosed as an application of XML in which a Unified Device Descriptor (UDD) is used to specify digital devices. Each digital device has a unique UDD dedicated to it, which describes parameters, such as device characteristics, capabilities, features, status, geographic information, maintenance record, job billing information, support/administration information, and the like. Using Document Type Definition (DTD), the invention precisely defines the logical structure of a UDD, so that each manufacture or device administrator will fill the contents for its devices. One of the major benefits of using a DTD in XML that it makes each UDD precisely searchable using standard Internet searching technologies. In contrast, with current HTML based search technologies, a search results in a large amount of returned information that is irrelevant or false. Thus, the invention facilitates the operation of using a web browser to identify digital devices. The Internet based technique of the invention also facilitates cross-platform functionality. Thus, digital devices using different operating systems and connectivity schemes can still communicate.

The invention can be appreciated by envisioning a digital device's installation, discovery, connection, use, and management in the Internet environment in the way that the data has been published: device installation and configuration= data modeling; device registration=data publishing; device discovery=data searching; device connect=data access; device use=data access interactively; and device status=data query/data pushing/data interchange. Each device's UDD may be stored in the device itself. Alternately, the UDDs can be consolidated into a central server which serves the device. The system administrator can register the UDDs into the default search engine or some major search engine which is XML enabled.

The UDD acts as a focal point between the digital device and a network administrator. Once a user locates a device's UDD, a variety of actions can be taken to interact with this UDD. The system administrator may interact with the UDD to perform administration tasks via the system administration applications 52. Device manufacturers can interact with the UDD to do troubleshooting and maintenance tasks via the device vendor applications 54.

Executable modules 78 in the form of Java applets or any other appropriate scripts can be embedded into the UDD to perform various information exchange, status monitoring, and format conversion operations. For example, the Java applets may be implemented to perform individual and specific tasks such as, status monitoring, job spooling, and error handling.

Figure 2:
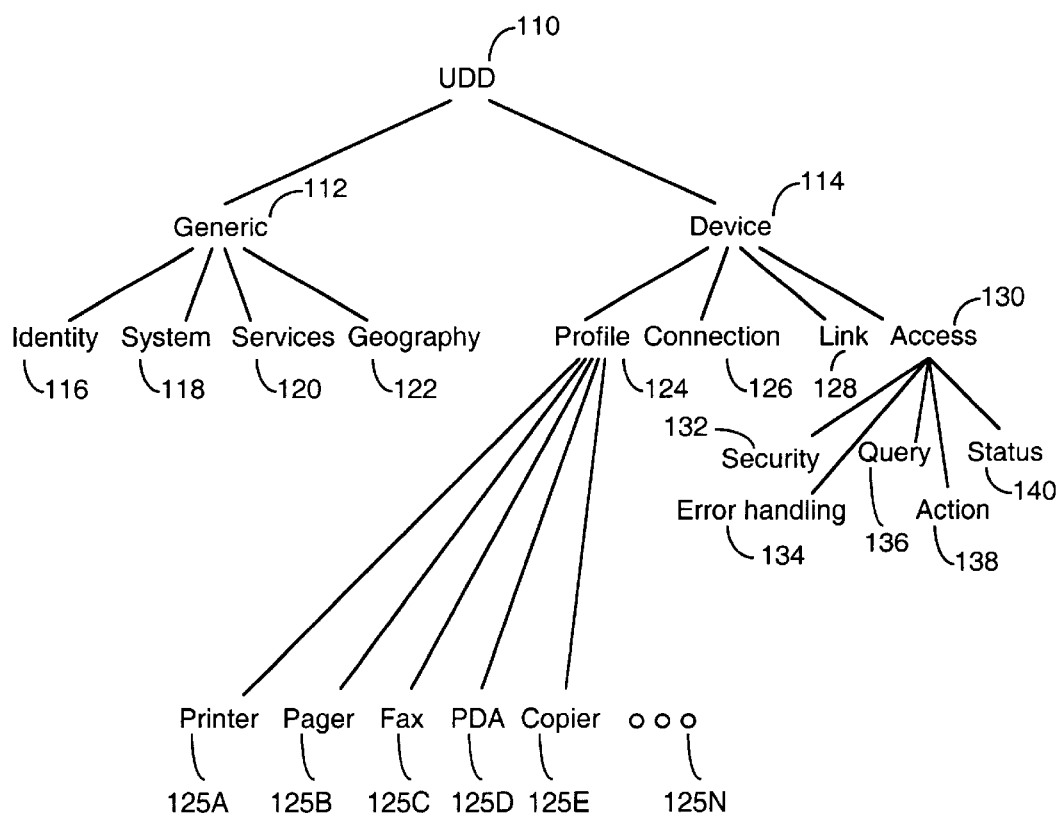
FIG. 2 illustrates a data structure for a Uniform Device Descriptor utilized in accordance with an embodiment of the invention.

FIG. 2 illustrates a data structure for a UDD utilized in accordance with the invention. The UDD has a root node 110. Stemming from the root node 110 are generic attributes 112 and device attributes 114. In other words, a digital device characterized by a UDD is characterized by generic attributes 112 that are common to all digital devices. The digital device characterized by the UDD is also characterized by device attributes 114 that are particular to the digital device under consideration.

Generic attributes 112 include identity attributes 116, system attributes 118, service attributes 120, and geography attributes 122. The device attributes 114 include profile attributes 124. Profile attributes 124 include profiles for various digital devices, including a printer 125A, a pager 125B, a fax machine 125C, a personal digital assistant 125D, a copier 125E, and any other devices, as represented by numeral 125N.

The device attributes 114 also include connection attributes 126, linking attributes 128, and access attributes 130. The access attributes 130 specify executable modules that may be invoked in connection with the UDD. FIG. 2 illustrates security 132, error handling 134, query 136, action 138, and status 140 executable modules that may be implemented in the UDD of the invention.

This overview of the UDD structure is now supplemented with a specific implementation. Explanations and annotations of the following XML code of Table I are marked by an introductory character string of "<!- -" and an ending character string of "- ->". Each digital device with a UDD file complies with the following Document Type Definition (DTD).

TABLE I

```
<!-- Each digital device has its own XML file which obeys the
Universal Device Descriptor defined in udd.dtd, below.-->
<?xml version="1.0" standalone="no"?>
```

TABLE I-continued

```
<!DOCTYPE udd SYSTEM "udd.dtd">
<!-- The following code defines global parameters known as
notation and entity.-->
<!NOTATION tiff PUBLIC
"-//ISBN 0-7923-9432-1::Graphic Notation//NOTATION
    Aldus/Microsoft Tagged Interchange File Format//EN">
<!NOTATION Ops PUBLIC "-//ISBN 0-7923-9432-1::Graphic
Notation//NOTATION
    Adobe Systems Encapsulated Postscript//EN">
<!NOTATION ps PUBLIC
"-//ISBN 0-7923-9432-1::Graphic Notation//NOTATION
    Adobe Systems Postscript//EN">
<!NOTATION pcl PUBLIC "-//ISBN 0-7923-9432-1::Graphics
Notation//NOTATION
    Hewlett-Packard Corp. Print Control Language//EN">
<!NOTATION gif PUBLIC "-//ISBN 0-7923-9432-1::Graphics
Notation//NOTATION
    Graphic Interchange Format//EN">
<!NOTATION jpeg PUBLIC "-//ISBN 0-7923-9432-1::Graphics
Notation//NOTATION
    JPEG//EN">
<!NOTATION mpeg PUBLIC "-//ISBN 0-7923-9432-1::Graphics
Notation//NOTATION
    MPEG//EN">
<!NOTATION png PUBLIC "-//ISBN 0-7923-9432-1::Graphics
Notation/NOTATION
    PNG//EN">
<!NOTATION pdf PUBLIC "-//ISBN 0-7923-9432-1::Graphics
Notation/NOTATION
    Portable Document Format dobe Systems//EN">
<!NOTATION html PUBLIC "-//ISBN 0-7923-9432-1::Graphics
Notation//NOTATION
    HTML//EN">
<!NOTATION text PUBLIC
"-//ISBN 0-7923-9432-1::Text Notation//NOTATION
    TEXT//EN">
<!NOTATION http PUBLIC
"Protocol Notation//NOTATION HTTP//EN">
<!NOTATION tcp PUBLIC "Protocol Notation//NOTATION TCP//EN">
<!NOTATION ftp PUBLIC "Protocol Notation//NOTATION FTP//EN">
<!ENTITY % statuslist "draft|revised|final|dead">
<!--The following code defines basic entities.-->
<!ENTITY % inputdevicelist "scanner|camera|pager|(#PCDATA)">
<!ENTITY % outputdevicelist "printer|projector|(#PCDATA)">
<!ENTITY % biputdevicelist "copier|mfd|fax|phone|pda|storage|erver|
(#PCDATA)">
<!ENTITY % devicelist
"%inputdevicelist;|%outputdevicelist;|%biputdevicelist;">
<!ENTITY % inputdeviceprofilelist "scanner.prof|camera.prof|pager.prof
|(#PCDATA)">
<!ENTITY % outputdeviceprofilelist
"printer.prof|projector.prof|(#PCDATA)">
<!ENTITY % biputdeviceprofilelist
"copier.prof|mfd.prof|fax.prof|phone.prof|
    pda.prof|storage.prof|server.prof|(#PCDATA)">
<!ENTITY % devicelist "%inputdeviceprofilelist;
|%outputdeviceprofilelist;
    %biputdeviceprofilelist;">
<!ENTITY % protocollist "enthernet|parallel|usb|irda|serial|(#PCDATA)">
<!ENTITY % connectionlist "http|ftp|tcp|parallel|usb|irda|serial
|(#PCDATA)">
<!ENTITY % mapref SYSTEM (#PCDATA) NDATA (gif|jpeg)>
<!ENTITY % urlref SYSTEM (#PCDATA) URL)>
<!ENTITY % reflist "pointer IDREF #REQUIRED">
<!ENTITY % emailref SYSTEM (#PCDATA) URL)>
<!ENTITY % phoneref SYSTEM (#PCDATA) URL)>
<!ENTITY % addressref SYSTEM (#PCDATA) URL)>
<!ENTITY % input-format "tiff|jpeg|mpeg|png|gif|ps|eps">
<!ENTITY % output-format "ps|pcl|tiff|png|pdf|jpeg|gif|html|text">
<!ENTITY % yes-no "yes|no">
<!ENTITY % paper-type "plain|transparency|gloss">
<!ENTITY % papersize "letter|legal|ledger|a4|b3">
<!ENTITY % color-model "cmyk|hexcolor|rgb">
<!ENTITY % orientation "portrait|landscape">
<!--The following code defines the UDD root node 110.-->
<!ELEMENT udd (generic, device+)>
<!ATTLIST udd
    status (%statuslist;) "draft"
    xml:lang (EN) "EN"
```

TABLE I-continued

```
    udd.version CDATA #REQUIRED
    udd.date CDATA #REQUIRED
    udd.id "%!udd"%⇆ #REQUIRED
    copyright CDATA #IMPLIED>
<!--The following code defines the generic attributes 112.-->
<!ELEMENT generic (identity, system, geography, service)>
<!--The following code defines the identity attribute 116. In particular, the
code defines a device type, a device name, a device ID, a device serial
number, a device model, a device owner, a device vendor,
and a device version.-->
<!ELEMENT identity (#PCDATA)>
<!ATTLIST identity
    DevType (%devicelist;)           #REQUIRED
    DevName CDATA                    #REQUIRED
    DevID CDATA                      #REQUIRED
    DevSerNo CDATA                   #REQUIRED
    DevModel CDATA                   #REQUIRED
    DevOwner CDATA                   #REQUIRED
    DevVendor CDATA                  #REQUIRED
    DevVersion CDATA                 #REQUIRED
<!--The following code defines system attributes, such as the domain name
for the system, the device server, and the device URL.-->
<!ELEMENT System (#PCDATA)>
<!ATTLIST system
    DomainName CDATA #REQUIRED
    DevIP CDATA #REQUIRED
    DevHWAddr CDATA #REQUIRED
    DevServer CDATA #REQUIRED
    DevURL (%urlref;) #REQUIRED>
<!--The following code defines geography attributes 122, such as room
number, building number, floor number, address, etc.-->
<!ELEMENT geography (#PCDATA)>
<!ATTLIST geography
    RoomNo CDATA #REQUIRED
    BuildNo CDATA #REQUIRED
    FloorNo CDATA #REQUIRED
    Address CDATA #REQUIRED
    City CDATA #REQUIRED
    StateCode CDATA #REQUIRED
    ZipCode CDATA #REQUIRED
    CountryCode CDATA #REQUIRED
    MailStop CDATA #REQUIRED
    Map (%mapref;) #IMPLIED>
<!--The following code defines service attributes 120, such as ad-
ministrator information, vendor information, supplier information,
and the like.-->
<!ELEMENT service (AdminInfo, VendorInfo, SupplierInfo)>
<!ELEMENT AdminInfo (#PCDATA)>
<!ATTLIST AdminInfo
    admin-email (%emailref;)         #REQUIRED
    admin-phone (%phoneref;)         #REQUIRED
    admin-address (%addressref;)     #REQUIRED
<!ELEMENT VendorInfo (#PCDATA)>
<!ATTLIST VendorInfo
    vendor-email (%emailref;)        #REQUIRED
    vendor-phone (%phoneref;)        #REQUIRED
    vendor-address (%addressref;)    #REQUIRED>
<!ELEMENT SupplierInfo (#PCDATA)>
<!ATTLIST SupplierInfo
    supplier-email (%emailref;)      #REQUIRED
    supplier-phone (%phoneref;)      #REQUIRED
    supplier-address (%addressref;)  #REQUIRED>
<!--The following code defines device attributes 114.-->
<!ELEMENT device (profile, connection?, linkage?, access?)>
<!ELEMENT device
    name.ref CDATA                   #IMPLIED>
<!--The following code defines profile attributes 124. The code defines
attributes for a number of devices, including a printer, projector, camera,
scanner, pager, copier, fax, phone, multifunction device (mfd), personal
computer, personal digital assistant (pda), server, and a storage device.
Naturally, additional devices can be specified. For each device a set of
attributes is defined. For example, the printer has specified attributes of
a name, input format (Iformat), Duplex characteristics, paper size, paper
type, paper orientation, color capability, color model, color profile, and
the address of executable modules 78 (DriverURL) associated with the
printer. The remaining devices include a set of specified attributes,
as shown below.-->
<!ELEMENT profile (%deviceprofilelist;)*>
<!ELEMENT printer.prof (%outputdevice;)>
<!ATTLIST printer.prof
    Name CDATA #IMPLIED
    IFormat (%output-format;) #REQUIRED
    Duplex (%yes-no;) "no"
    N-Up CDATA #REQUIRED
    PaperSize (%papersize;) "letter"
    PaperType (%papertype;) "plain"
    Orientation (%orientation;) "portrait"
    Color (%yes-no;) "no"
    ColorModel (%color-model;) #IMPLIED
    ColorProfile (%urlref;) #IMPLIED"
    DriverURL (%urlref;) #IMPLIED>
<!ELEMENT projector.prof (%outputdevice;)>
<!ATTLIST projector.prof
    Name CDATA #IMPLIED
    IFormat (%output-format;) #REQUIRED
    Zoom CDATA #REQUIRED
    Color (%yes-no;) "no"
    ColorModel (%color-model;) #IMPLIED
    Orientation (%orientation;) "portrait"
    ColorProfile (%urlref;) #IMPLIED"
    DriverURL (%urlref;) #IMPLIED>
<!ELEMENT camera.prof (%inputdevice;)>
<!ATTLIST camara.prof
    Name CDATA #IMPLIED
    Zoom CDATA #REQUIRED
    Color (%yes-no;) "no"
    ColorModel (%color-model;) #IMPLIED
    OFormat (%input-format;) #REQUIRED
    Orientation (%orientation;) "portrait"
    ColorProfile (%urlref;) #IMPLIED"
    DriverURL (%urlref;) #IMPLIED>
<!ELEMENT scanner.prof (%inputdevice;)>
<!ATTLIST scanner.prof
    Name CDATA #IMPLIED
    Zoom CDATA #REQUIRED
    Color (%yes-no;) "no"
    ColorModel (%color-model;) #IMPLIED
    Orientation (%orientation;) "portrait"
    OFormat (%input-format;) #REQUIRED
    ColorProfile (%urlref;) #IMPLIED"
    DriverURL (%urlref;) #IMPLIED>
<!ELEMENT pager.prof (%inputdevice;)>
<!ATTLIST pager.prof
    Name CDATA #IMPLIED
    Phone CDATA #REQUIRED
    DriverURL (%urlref;) #IMPLIED>
<!ELEMENT copier.prof (%biputdevice;)>
<!ATTLIST copier.prof
    Name CDATA #IMPLIED
    IFormat (%input-format;) #REQUIRED
    OFormat (%input-format;) #REQUIRED
    Zoom CDATA #REQUIRED
    Duplex (%yes-no;) "no"
    Binding (%yes-no;) "no"
    N-Up CDATA           #REQUIRED
    Color (%yes-no;) "no"
    ColorModel (%color-model;) #IMPLIED
    Orientation (%orientation;) "portrait"
    PaperSize (%papersize;) "letter"
    PaperType (%papertype;) "plain"
    Color (%yes-no;) "no"
    Color Model (%color-model;) #IMPLIED
    ColorProfile (%urlref;) #IMPLIED"
    DriverURL (%urlref;) #IMPLIED>
<!ELEMENT fax.prof(%biputdevice;)>
<!ATTLIST fax.prof
    Name CDATA #IMPLIED
    IFormat (%input-format;)#REQUIRED
    OFormat (%output-format;)#REQUIRED
    Zoom CDATA #REQUIRED
    PaperSize (% papersize;) "letter"
    PaperType (%papertype;) "plain"
    Color (%yes-no;) "no"
    ColorModel (%color-model;)#IMPLIED
    Orientation (%orientation;) "portrait"
    DriverURL (%urlref;) #IMPLIED>
<!ELEMENT phone.prof (%biputdevice;)>
<!ATTLIST phone.prof
```

TABLE I-continued

```
        Name CDATA #IMPLIED
        Phone CDATA #REQUIRED
        Extension CDATA #REQUIRED
        Audix CDATA #REQUIRED
        AnswerMessage (%urlref;) #IMPLIED
        VoiceMail (%urlref;) #IMPLIED"
        DriverURL (%urlref;) #IMPLIED>
<!ELEMENT mfd.prof (%biputdevice;)>
<!ATTLIST md.prof
        Name CDATA #IMPLIED
        Zoom CDATA #REQUIRED
        IFormat (%input-format;) #REQUIRED
        OFormat (%output-format;) #REQUIRED
        Duplex (%yes-no;) "no"
        Orientation (%orientation;) "portrait"
        PaperSize (%papersize;) "letter"
        PaperType (%papertype;) "plain"
        Color (%yes-no;) "no"
        ColorModel (%color-model;) #IMPLIED
        ColorProfile (%urlref;) #IMPLIED"
        DriverURL (%urlref;) #IMPLIED>
<!ELEMENT pc.prof (%biputdevice;)>
<!ATTLIST pc.prof
        Name CDATA #IMPLIED
        UserName CDATA #REQUIRED
        ShareAccess CDATA #REQUIRED
        HomeDirectory CDATA #REQUIRED
        MailServer #REQUIRED
        Calender #REQUIRED
        IPAddress CDATA #IMPLIED
        HWAddress CDATA #IMPLIED
        ServerName CDATA #REQUIRED>
<!ELEMENT pda.prof (%biputdevice;)>
<!ATTLIST pda.prof
        Name CDATA #IMPLIED
        UserName CDATA #REQUIRED
        ServerName CDATA #REQUIRED>
<!ELEMENT server.prof (%biputdevice;)>
<!ATTLIST server.prof
        Name CDATA #IMPLIED
        Name CDATA #REQUIRED
        IPAddress CDATA #IMPLIED
        HWAddress CDATA #IMPLIED
        AccessAttr #REQUIRED
        AccessURL (%urlref;) #REQUIRED
        ServerName CDATA #REQUIRED>
<!ELEMENT storage.prof (%biputdevice;)>
<!ATTLIST storage.prof
        Name CDATA #IMPLIED
        AccessAttr #REQUIRED
        AccessURL (%urlref;) #REQUIRED
        IPAddress CDATA #IMPLIED
        HWAddress CDATA #IMPLIED
        ServerName CDATA #REQUIRED>
<!-- More devices can be specified at this point. The definition of UDD is
evolving to accommodate new types of devices/appliances.-->
<!--The following code specifies connection attributes 126. In particular,
the code specifies the interfaces and protocols supported by the digital
device.-->
<!ELEMENT connection (#PCDATA)>
<!ATTLIST connection
        interface (%connectionlist;)+ #REQUIRED
        protocol (%protocollist;)+ #REQUIRED
<!--The following code specifies link attributes 128. This code supports
the ability to link output from one digital device with input to a second
digital device. Thus, for example, two digital devices may share the
responsibility to complete a task. Other examples of the use of this
feature are described below.-->
<!ELEMENT linkage (input|output|biput|#PCDATA)*>
<!ATTLIST linkage
        input (%urlref;|%reflist;) #IMPLIED
        output (%urlref;|%reflist;) #IMPLIED
        backup (%urlref;|%reflist;) #IMPLIED
        next (%urlref;|%reflist;) #IMPLIED
        previous) (%urlref;|%reflist;) #IMPLIED>
<!ELEMENT input (%urlref;|%reflist;)>
<!ELEMENT output (%urlref;|%reflist;)>
<!ELEMENT biput (%urlref;|%reflist;)>
<!--The following code defines access attributes 130. The access attributes
130 specify different executable modules 78 that may be invoked for
performance by a digital device. The following code defines a "query"
module at a specified location ("urlref"). Related modules exist for status,
security, action, and error handling.-->
<!ELEMENT access (query?, status?, security?, action?, errorhandling?)>
<!--NOTE: here ATTLIST is for non-visual usage of the udd file -->
<!ATTLIST access
        query (%urlref;)           #REQUIRED
        status (%urlref;)          #REQUIRED
        security (%urlref;)        #REQUIRED
        action (%urlref;)          #REQUIRED
        errorhandling (%urlref;)   #REQUIRED>
<!-- The following code is for visual use. As above, the "urlref" refers
to the location that the applet, driver or script resides. The executable
module is invoked to perform an action in connection with the
digital device.-->
<!ELEMENT query (%urlref;)>
<!ELEMENT status (%urlref;)>
<!ELEMENT security (%urlref;)>
<!ELEMENT action (%urlref;)+>
<!ELEMENT errorhandling (%urlref;)>
```

The foregoing file structure is more fully appreciated with reference to a specific example. Assume that there are two printers in a building at Sun Microsystems, Inc., Palo Alto, Calif., the assignee of the present invention. The two printers are on the second floor of building 4 (SUN04) in Sunnyvale, Calif. One printer is defined as "snowpup10" and the other is defined as "snowpup14". UDD files "snowpup10.xml" and "snowpup14.xml" are created to comply with the UDD definition set forth above.

The following assumptions are also made. First, snowpup10.xml has a network address of http://shoki.eng/printer/. The driver code for "snowpup10" is located at http://shoki.eng/printer/snowpup10/bin/driver. Executable modules to perform actions like query, printing, error handling, security checks, and job handling are stored at http://shoki.eng/printer/snowpup10/. The XML UDD file of Table II is non-visual, so it is suitable for device-to-device communication.

TABLE II

```
<?xml version="1.0" standalone="no"?>
<!-- Define the root node 110.-->
<!DOCTYPE udd SYSTEM "udd.dtd">
<udd status="draft" xml:lang="EN" udd.version="1.0"
udd.date="1999.5.5"
udd.id="%!udd!%" copyright="Sun Microsystems Inc">
<!--Define the generic attributes 112.-->
<generic>
<!--Define the identity attributes 116.-->
<identity DevType="printer" DevName="snowpup10" DevID="1001"
DevSerNo="300201131001" DevModel="Lexmark 111"
DevOwner="platform group"
DevVendor="Lexmark" DevVersion="1.22.1"> </identity>
<system DomainName="Eng.Sun.Com" DevIP="129.144.12.10"
DevHWAddr="0.3.0.34.02.3" DevServer="shoki"
DevURL="http://shoki.eng/printer/snowpup10/driver"> </system>
<!--Define the geography attributes 122.-->
<geography RoomNo="2000" BuildNo="SUN04" FloorNo="2"
Address="430 N.Mary Ave"
City="Sunnyvale" StateCode="CA" ZipCode="94086"
CountryCode="us" MailStop="SUN04-203"
Map="http://shoki.eng/printer/snowpup10/map"> </geography>
<!--Define the service attributes 120.-->
<service>
<AdminInfo/ admin-email="jici@shoki" admin-phone="x48895"
admin-address="SUN04-203-2015">
<VendorInfo/ vendor-email="support@lexmark.com"
vendor-phone="1800lexmark" vendor-address=" ">
<SupplierInfo/ supplier-email="support@supply.com"
```

TABLE II-continued

```
supplier-phone="1800supply" supplier-address=" ">
</service>
</generic>
<!--Define the device attributes 114.-->
<device>
<!--Define the profile attributes 124.-->
<profile>
<printer.prof Name="snowpup10" IFormat="ps, pcl" Duplex="no"
N-up="1" PaperSize="letter" PaperType="plain, transparency"
Orientation="portrait" Color="no"
DriverURL="http://shoki.eng/printer/snowpup10/bin/driver">
</printer.prof>
</profile>
<connection/ interface="ethernet, parallel" protocol="tcp, ftp, parallel,
telnet"> <linkage/ backup="http://shoki.eng/printer/snowpup14.xml">
<access query="http://shoki.eng/printer/snowpup10/query.pl"
status="http://shoki.eng/printer/snowpup10/status.pl"
security="http://shoki.eng/printer/snowpup10/security.class"
action="http://shoki.eng/printer/snowpup10/action.jar" errorhandli
ng="http://shoki.eng/printer/snowpup10/error.jar">
<query/> <status/> <security/> <action/> <errorhandling/>
</access>
</device>
</udd>
```

Figure 3:
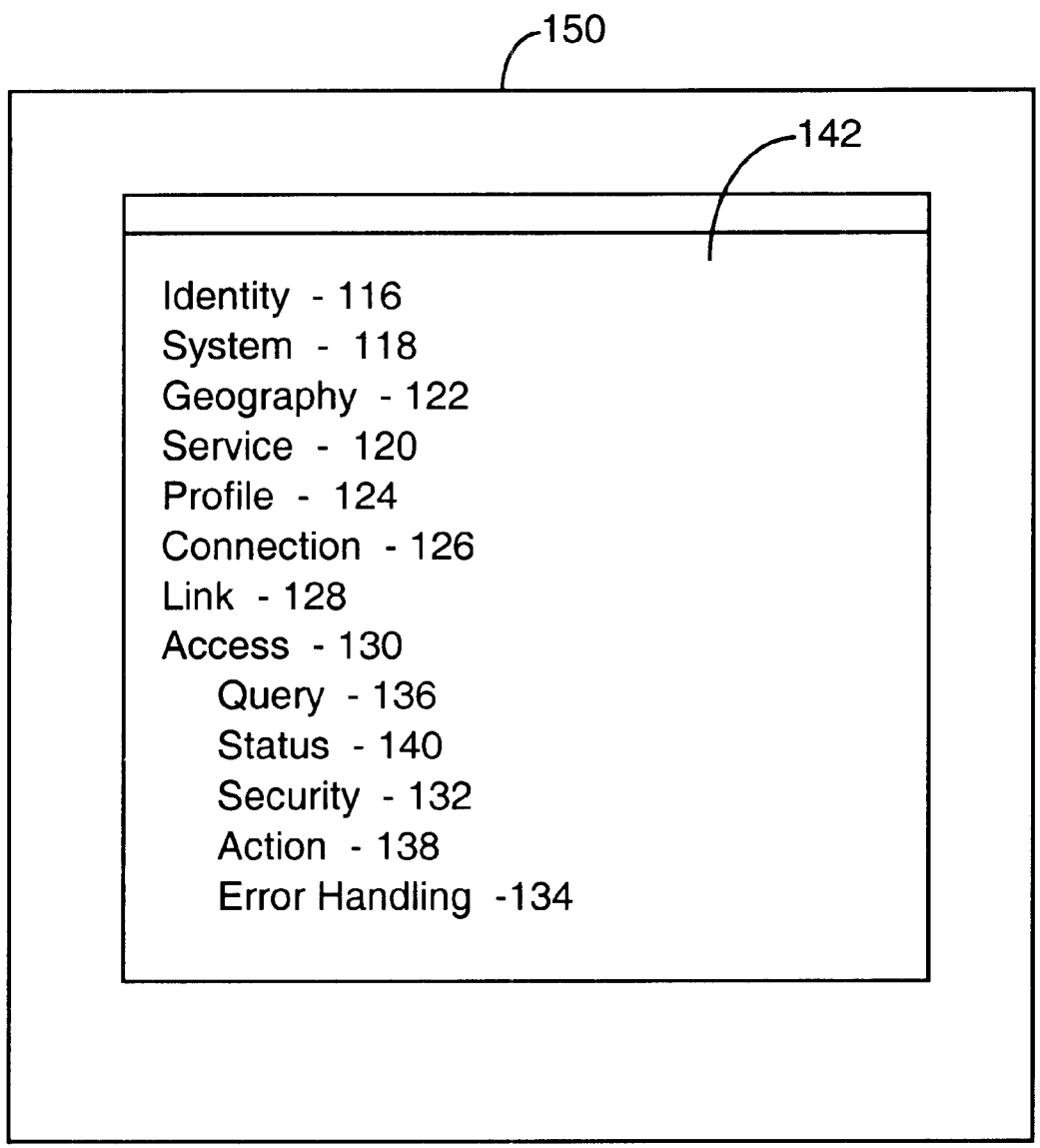
FIG. 3 illustrates a Uniform Device Descriptor file of the invention presented in a visual display.

Alternately, the foregoing code can be implemented in a visual form so that a user can interact with the page. FIG. 3 illustrates a browser 142 on a display device 150, such as a computer monitor, flat panel screen, and the like. The browser displays the contents of the UDD file, including identity attributes 116, system attributes 118, geography attributes 122, service attributes 120, profile attributes 124, connection attributes 126, L Link attributes 128, access attributes 130 query executable modules 136, status executable modules 140, security executable modules 132, action executable modules 138, and error handling executable modules 134.

The code of Table III is an example of a visual page that allows a user to interact with a displayed UDD file.

TABLE III

```
<!--The following code defines the UDD root node 110.-->
<?xml version="1.0" standalone="no"?>
<!DOCTYPE udd SYSTEM "udd.dtd">
<udd status="draft" xml:lang="EN"
udd.version="1.0" udd.date="1999.5.5"
udd.id="%!udd!%" copyright="Sun Microsystems Inc">
<!--The following code defines generic attributes 112,
including identity attributes 116, system attributes 118, and geography
attributes 122, and service attributes 120.-->
<generic>
<identity DevType="printer" DevName="snowpup10" DevID="1001"
DevSerNo="300201131001" DevModel="Lexmark 111" DevOwner=
"platform group"
DevVendor="Lexmark" DevVersion="1.22.1">Welcome to Home
Page of the Printer snowpup10</identity>
<system DomainName="Eng.Sun.Com" DevIP="129.144.12.10"
DevHWAddr="0.3.0.34.02.3" DevServer="shoki"
DevURL="http://shoki.eng/printer/snowpup10/driver">I am in the domain
of Eng.Sun.Com and maintained by Sun Microsystem platform group</
system>
<geography RoomNo="2000" BuildNo="SUN04" FloorNo="2"
Address="430 N.Mary Ave"
City="Sunnyvale" StateCode="CA"
ZipCode="94086" CountryCode="us"
MailStop="SUN04-203" Map="http://shoki.eng/printer/snowpup10/map">
I am located in 430 N. Mary Ave, Sunnyvale, CA 94086, Building 4
Floor 2 and MailStop SUN04-203. Here is the map shows where I am
sitting<href="shoki.eng/printer/snowpup10/map"> </geography>
<service>
<AdminInfo admin-email="jici@shoki" admin-phone="x48895"
admin-address="SUN04-203-2015">Jici Gao is your system administor
```

TABLE III-continued

```
for me, he can be reached at x48895 and email:jici@shoki
<VendorInfo vendor-email="support@lexmark.com" vender-phone=
"1800lexmark" vendor-address="www.lexmark.com/lexmark111">
Here is the vendor information, in
case you need: . . . </VenderInfo> <SupplierInfo supplier-email=
"support@supply.com"
supplier-phone="1800supply"supplier-address="www.supply.com">Here
is the supplier information in case we run of the paper or toner:
. . . </SupplierInfo>
</service>
</generic>
<device>
<profile>
<!--The following code defines devices attributes 114, including
profile attributes 124, connection attributes 126, link attributes
128, and access attributes 130.-->
<printer.prof Name="snowpup10" IFormat="ps, pcl" Duplex="no" N-up=
"1" PaperSize="letter" PaperType="plain, transparency" Orientation=
"portrait" Color="no"
DriverURL="http://shoki.eng/printer/snowpup10/bin/driver">This
printer can take PostScript and PCL format . . .
</printer.prof>
</profile>
<connection interface="ethernet, parallel" protocol="tcp, ftp, parallel,
telnet">This printer has ethernet connection and takes TCP/IP and FTP,
Telnet, LP and Parallel protocols</connection> <linkage backup=
"http://shoki.eng/printer/snowpup14.xml">I have a backup printer,
if I am out of work, the job will be routed to it : snowpup14!</linkage>
<access query="http://shoki.eng/printer/snowpup10/query.pl"
status="http://shoki.eng/printer/snowpup10/status.pl"
security="http://shoki.eng/printer/snowpup10/security.class"
action="http://shoki.eng/printer/snowpup10/action.jar"
errorhandling="http://shoki.eng/printer/snowpup10/error.jar">
<query>Query<href="http://shoki.eng/printer/snowpup10/query.jar"
img="http://shoki.eng/printer/snowpup10/query.gif"> </query>
<status>Status<href="http://shoki.eng/printer/snowpup10/status.jar"
img="http://shoki.eng/printer/snowpup10/status.gif"> </status>
<security>Securityhref="http://shoki.eng/printer/snowpup10/security.jar"
img="http://shoki.eng/printer/snowpup10/security.gif"> </security>
<action>Action<href="http://shoki.eng/printer/snowpup10/action.jar"
img="http://shoki.eng/printer/snowpup10/action.gif"> </action>
<errorhandling>ErrorHandling<href=
"http://shoki.eng/printer/snowpup10/errorhandling.jar"
img="http://shoki.eng/printer/snowpup10/errorhandling.gif"> </error-
handling>
</access>
</device>
</udd>
```

Table IV provides another example of code that may used in accordance with the invention. In this example, a personal workstation has two networked printers (snowpup10 and snowpup14), a phone, a digital camera and server shoki. The personal workstation, two networked printers, and the server are connected in a networked environment. The phone and digital camera are not connected to the network. Thus, the phone and digital camera are described as part of the personal workstation. The server and printers have their own xml page and are linked into pc.xml.

TABLE IV

```
<!--The following code defines the UDD root node 110.-->
<?xml version="1.0" standalone="no"?>
<!DOCTYPE udd SYSTEM "udd.dtd">
<udd status="draft" xml:lang="EN" udd.version="1.0" udd.date=
"1999.5.5" udd.id="%!udd!%"
copyright="Sun Microsystems Inc">
<!--The following code defines generic attributes 112, including identity
attributes 116, system attributes 118, geography attributes 122, and service
attributes 120.
<generic>
<identity DevType="pc" DevName="jgao" DevID="1002"
DevSerNo="30020223000"
DevModel="SUN Ultra 1 Workstation" DevOwner="platform group"
```

TABLE IV-continued

```
DevVendor="Sun
Microsystem" DevVersion="5.7"> </identity>
<system DomainName="Eng.Sun.Com" DevIP="129.144.12.109"
DevHWAddr="8:0:20:8d:23:81" DevServer="shoki"
DevURL="http://shoki.eng/pc/jgao.eng/"> </system>
<geography RoomNo="2025" BuildNo="SUN04" FloorNo="2"
Address="430 N.Mary Ave"
City="Sunnyvale" StateCode="CA"
ZipCode="94086" CountryCode="us"
MailStop="SUN04-203" Map="http://shoki.eng/pc/jgao.eng/map">
</geography>
<service>
<AdminInfo/ admin-email="jici@shoki" admin-phone="x48895"
admin-address="SUN04-203-2015">
<VendorInfo/ vendor-email="ens@eng.sun.com" vendor-phone=
"1800sunrise" vendor-address="www.sun.com">
<SupplierInfo/supplier-email="ens@eng.sun.com"
supplier-phone="1800sunrise" supplier-address="www.sun.com">
</service>
</generic>
<!--The following code device attributes 114, including profile
attributes 124, connection attributes 126, and access attributes 130.
The access attributes 130 include query attributes 136, action
attributes 138, and error handling attributes 134.-->
<device>
<profile>
<pc.profName="jgao" UserName="jici", ShareAccess="rwxr-xr-x",
HomeDirectory="/home/jici" MailServer="/shoki.eng/Mail/jici
Calender="/shoki.eng/Calender/jici" IPAddress="129.144.12.109"
HWAddress="8:0:20:8d:23:81" ServerName="shoki.eng">
</pc.prof>
</profile>
<connection/ interface="ethernet, parallel, serial" protocol="tcp, ftp,
parallel, telnet, serial">
<linkage input=" "output="http://shoki.eng/printer/snowpup10"
backup="http://shoki.eng/"
next="http://shoki.eng/printer/snowpup14">
<input/ pointer="jgao-camera"> <biput/ pointer="jgao-phone"></linkage>
<access query="http://shoki.eng/pc/jgao/query.pl"
status="http://shoki.eng/pc/jgao/status.pl"
security="http://shoki.eng/pc/jgao/security.class"
action="http://shoki.eng/pc/jgao/action.jar"
errorhandling="http://shoki.eng/pc/jgao/error.jar">
<query/> <status/> <security/> <action/> <errorhandling/>
</access>
<!--The following code describes the camera attributes, again relying
upon the UDD file structure shown in FIG. 2.-->
</device>
<device name.ref="jgao-camera">
<profile>
<camera.profName="jgao-camera" Zoom="default" Color="yes"
OFormat="jpeg, gif"
DriverURL="http://shoki.eng/pc/jgao.eng/jgao-camera">
</camera.prof>
</profile>
<connection/ interface="paralel", protocol="parallel">
<access query="http://shoki.eng/pc/jgao/jgao-camera/query.jar"
action="http://shoki.eng/pc/jgao/jgao-camera/action.jar"
errorhandling="http://shoki.eng/pc/jgao/jgao-camera/error.jar"> </access>
<!--The following code describes the phone attributes, again relying
upon the UDD file structure shown in FIG. 2.-->
</device>
<device name.ref="jgao-phone">
<profile>
<phone.prof Name="jgao-phone" Phone="408-328-8995"
Extension="48995" Audix="48500" AnswerMessage=
"http://shoki.eng/pc/jgao.eng/jgao-phone/answermessage"
VoiceMail="http://shoki.eng/pc/jgao.eng/jgao-phone/voicemail"
DriverURL="http://shoki.en
g/pc/jgao.eng/jgao-phone">
</phone.prof>
</profile>
<access query="http://shoki.eng/pc/jgao/jgao-phone/query.jar"
action="http://shoki.eng/pc/jgao/jgao-phone/action.jar"
errorhandling="http://shoki.eng/pc/jgao/jgao-phone/error.jar"> </access>
</device>
</udd>
```

Those skilled in the art will appreciate that the disclosed technology allows digital devices to be easily and precisely located through a web browser search. The web browser search can be used to identify digital devices with selected attributes, such as device location, device speed, device functionality, and the like, as specified in the UDD file 76 for each digital device. The search module 80 may rely upon existing Internet searching techniques to match specified attributes in a search request with attributes in a UDD file. For example, the search request may specify generic attributes 112 including system attributes 118 and geography attributes 122. The search may further specify device attributes 114 including profile attributes 124 and connection attributes 126. A UDD file satisfying the specified criteria is then selected using standard searching techniques.

Once a digital device is located, the user can communicate with the digital device in a variety of modes. In one mode, the user observes the home page dedicated to the device (see, for example, FIG. 3). The device home page describes the device's features, capabilities, location, and other device attributes. In a second mode, peer-to-peer or machine-to-machine communications are established via executable programs that assess the status of a digital device. A status page for the device may be sent. In addition, Java applets may be embedded in the digital device home page. For example, Java applets may be used to send jobs to a digital device or capture output from a digital device. These techniques may be used by a system administrator to remotely maintain digital devices. A digital device manufacturer may use this feature to facilitate upgrades or updates to the digital device or to remotely perform trouble shooting for the digital device.

Multiple devices can be chained to perform complex tasks. For example, a second printer can be chained into a first printer UDD to be a backup, or to speed up printing of a big job, if they are the exact same kind of printers. This may be achieved through reliance upon the previously described link attribute 128. The link attribute 128 may also be used to chain an input device directly into an output device, if a common communication format is used. Thus, for example, a digital camera can be linked directly into a color printer. In this case, a user clicks the camera and its output is automatically printed at the designated printer.

Examples of the invention include person-to-person communications. In this mode, suppose Person A and Person B each have a personal computer that is equipped with a digital voice system and Internet connections. Each person is assumed to be using an XML-compliant browser. If they share their UDD pages, a number of actions can be taken. For example, if Person A does not know where Person B is, Person A can execute a web browser-based search to identify Person B's UDD. If Person A clicks on a voice system icon within Person B's UDD, the applet associated with the voice system icon is activated and Person B's voice system rings and indicates that it is Person A calling. If Person B wants to accept the call, he may click on the voice system icon within his UDD. Thereafter, communication is established between Person A and Person B. If Person B is not available, Person A either leaves a message on Person A's voice system or on his email/note system by clicking the corresponding icon on Person B's UDD. Person B can place contact information for his business group or boss on his machine's UDD. If Person B is not available, Person A can bypass Person B and access the UDDs of Person B's business group or boss.

Person-to-device communications are also feasible in accordance with the invention. Suppose Person A wants to use a printer with duplex capacity. He searches the Internet by typing printer along with the specified capicity. Suppose there are two duplex printers in the Internet, one is monochrome and the other is color. There are also some simplex printers. Thus, the search sends back the UDDs for two printers. Person A wants to print a set of presentation reports in color. Therefore, he chooses the color duplex printer by accessing its UDD page. Now he sees everything in the page. He can click the status icon to query the status, or the page which reports the instant status of the printer. He can verify that there is enough paper inside the printer. He can also click the icon which allows him to send over his job. He may then go to another job while waiting for the printer to finish the print job. The status of the printer UDD will keep displaying the progress or status changes.

Another example of a person-to-device communication follows. Suppose Person A has a book to print which he does not want to print on his own machine. Thus, he searches for a printer in a nearby copy center. When he gets back the printer's UDD from the copy center, he can select parameters for the print job in the copy center. In this case, Person A may want some book-like binding that can be specified through the copy center's UDD.

Device-to-person interactions are also feasible in accordance with the invention. For example, the device may be a home security system. The home security system may have a UDD sensor device. The UDD also includes an address for Person A's voice device, page device, PDA, etc. When the sensor device generates a specified output signal, Person A is notified by the different means defined in the UDD.

The invention also supports device-to-device communications. For example, assume that the Internet includes a printer, a digital camera, and a storage drive. The printer UDD may have an input link from the digital camera's UDD, which has an output link to the storage device. Thus, when the digital camera takes a snapshot, the snapshot is sent to the printer and is stored in the storage drive.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method executed by one or more digital devices operating in a networked environment, said method comprising the steps of:
    storing a network address for each digital device of a plurality of digital devices within a networked environment;
    providing a plurality of Uniform Device Descriptor files, including associating a respective Uniform Device Descriptor file with each digital device of said plurality of digital devices, each respective Uniform Device Descriptor file characterizing a set of attributes associated with its corresponding digital device; and
    performing a search to identify and select a digital device having a set of attributes specified in a search request, including matching the specified attributes in the search request with attributes in at least one of the plurality of Uniform Device Descriptor files and identifying at least one digital device of the plurality of digital devices in accordance with the at least one Uniform Device Descriptor file that matches the specified attributes.

2. The method of claim 1, wherein each of the Uniform Device Descriptor files comprises an XML document, the XML document including a start tag and end tag for each attribute specified by the XML document, the start tag and end tag identifying the attribute and a value of the attribute being positioned between the start tag and end tag.

3. The method of claim 2, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device of the same type as the first device, the second device providing backup for the first digital device.

4. The method of claim 2, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device that is an output device with respect to the first digital device.

5. The method of claim 2, wherein the second Uniform Device Descriptor file includes a link attribute that links the second Uniform Device Descriptor file to the first Uniform Device Descriptor file, and the first digital device is an input device with respect to the second device.

6. The method of claim 2, wherein the plurality of Uniform Device Descriptor files are configured for searching using a web browser based search tool.

7. The method of claim 2, wherein a first Uniform Device Descriptor file of the plurality of Uniform Device Descriptor files includes a plurality of address attributes for contacting a person via a corresponding plurality of devices.

8. The method of claim 2, wherein a first Uniform Device Descriptor file of the plurality of Uniform Device Descriptor files includes a plurality of generic attributes, also included in a plurality of the other Uniform Device Descriptor files, and a plurality of device specific attributes, found only in the Uniform Device Descriptor files associated with devices of a same type as the digital device associated with the first Uniform Device Descriptor file.

9. The method of claim 8, wherein the plurality of device specific attributes include at least one link to a respective executable module that causes the digital device associated with the Uniform Device Descriptor file to perform a respective predetermined operation.

10. The method of claim 1, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device of the same type as the first device, the second device providing backup for the first digital device.

11. The method of claim 1, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device that is an output device with respect to the first digital device.

12. The method of claim 1, wherein the second Uniform Device Descriptor file includes a link attribute that links the second Uniform Device Descriptor file to the first Uniform Device Descriptor file, and the first digital device is an input device with respect to the second device.

13. The method of claim 1, wherein the plurality of Uniform Device Descriptor files are configured for searching using a web browser based search tool.

14. The method of claim 1, wherein a first Uniform Device Descriptor file of the plurality of Uniform Device Descriptor files includes a plurality of address attributes for contacting a person via a corresponding plurality of devices.

15. A computer readable memory to direct one or more digital devices in a networked environment to function in a specified manner, comprising:
   a digital device list specifying a network address for each digital device of a plurality of digital devices within a networked environment;
   a set of Uniform Device Descriptor files, each respective Uniform Device Descriptor file characterizing a set of attributes associated with a corresponding digital device of said plurality of digital devices; and
   a search module for performing a search to identify and select a digital device having a set of attributes specified in a search request, the search module configured to match the specified attributes in the search request with attributes in at least one of the set of Uniform Device Descriptor files to and identify at least one digital device of the plurality of digital devices in accordance with the at least one Uniform Device Descriptor file that matches the specified attributes.

16. The computer readable memory of claim 15, wherein each of the Uniform Device Descriptor files comprises an XML document, the XML document including a start tag and end tag for each attribute specified by the XML document, the start tag and end tag identifying the attribute and a value of the attribute being positioned between the start tag and end tag.

17. The computer readable memory of claim 16, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device of the same type as the first device, the second device providing backup for the first digital device.

18. The computer readable memory of claim 16, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device that is an output device with respect to the first digital device.

19. The computer readable memory of claim 16, wherein the second Uniform Device Descriptor file includes a link attribute that links the second Uniform Device Descriptor file to the first Uniform Device Descriptor file, and the first digital device is an input device with respect to the second device.

20. The computer readable memory of claim 16, wherein the plurality of Uniform Device Descriptor files are configured for searching using a web browser based search tool.

21. The computer readable memory of claim 16, wherein a first Uniform Device Descriptor file of the plurality of Uniform Device Descriptor files includes a plurality of address attributes for contacting a person via a corresponding plurality of devices.

22. The computer readable memory of claim 16, wherein a first Uniform Device Descriptor file of the plurality of Uniform Device Descriptor files includes a plurality of generic attributes, also included in a plurality of the other Uniform Device Descriptor files, and a plurality of device specific attributes, found only in the Uniform Device Descriptor files associated with devices of a same type as the digital device associated with the first Uniform Device Descriptor file.

23. The computer readable memory of claim 22, wherein the plurality of device specific attributes include at least one link to a respective executable module that causes the digital device associated with the Uniform Device Descriptor file to perform a respective predetermined operation.

24. The computer readable memory of claim 15, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device of the same type as the first device, the second device providing backup for the first digital device.

25. The computer readable memory of claim 15, wherein a first Uniform Device Descriptor file of the plurality of Uniform Device Descriptor files includes a link attribute that links the first Uniform Device Descriptor file to a second Uniform Device Descriptor file, wherein the first Uniform Device Descriptor file is associated with a first digital device and the second Uniform Device Descriptor file is associated with a second digital device that is an output device with respect to the first digital device.

26. The computer readable memory of claim 15, wherein the second Uniform Device Descriptor file includes a link attribute that links the second Uniform Device Descriptor file to the first Uniform Device Descriptor file, and the first digital device is an input device with respect to the second device.

27. The computer readable memory of claim 15, wherein the plurality of Uniform Device Descriptor files are configured for searching using a web browser based search tool.

28. The computer readable memory of claim 15, wherein a first Uniform Device Descriptor file of the plurality of Uniform Device Descriptor files includes a plurality of address attributes for contacting a person via a corresponding plurality of devices.

* * * * *